United States Patent [19]

Winkelman

[11] 4,323,722
[45] Apr. 6, 1982

[54] OVERHEAD ELECTRIC POWER TRANSMISSION LINE JUMPERING SYSTEM FOR BUNDLES OF FIVE OR MORE SUBCONDUCTORS

[75] Inventor: Paul F. Winkelman, Beaverton, Oreg.

[73] Assignee: The United States of America as represented by the United States Department of Energy, Washington, D.C.

[21] Appl. No.: 190,307

[22] Filed: Sep. 24, 1980

[51] Int. Cl.³ .............................................. H02G 7/00
[52] U.S. Cl. .................................................... 174/43
[58] Field of Search ............ 174/43, 128 BL, 140 CR, 174/141 R, 148, 149 R, 150

[56] References Cited

U.S. PATENT DOCUMENTS

| | | | |
|---|---|---|---|
| 3,129,279 | 4/1964 | Barton | 174/43 |
| 3,624,268 | 11/1971 | Otsuki et al. | 174/43 |
| 3,647,933 | 3/1972 | Okada et al. | 174/43 |

FOREIGN PATENT DOCUMENTS

| | | | |
|---|---|---|---|
| 177823 | 3/1954 | Austria | 174/43 |
| 932733 | 9/1955 | Fed. Rep. of Germany | 174/43 |
| 44-21073 | 9/1969 | Japan | 174/43 |
| 46-31428 | 9/1971 | Japan | 174/43 |
| 46-38231 | 11/1971 | Japan | 174/43 |
| 54-4394 | 1/1979 | Japan | 174/43 |

OTHER PUBLICATIONS

West, H. J., Laboratory Report No. ERJ-77-61, "1100 KV Internally Jumpered Multiple Bundle Deadend Assembly, Prototype RIV and Visual Corona Tests", U.S. Department of the Interior–Bonneville Power Administration; 15 pages, Indexed Apr. 1977.

Primary Examiner—Laramie E. Askin
Attorney, Agent, or Firm—Douglas E. Erickson; Richard E. Constant; Richard G. Besha

[57] ABSTRACT

Jumpering of electric power transmission lines at a dead end tower. Two transmission line conductor bundles each contain five or more spaced apart subconductors (5) arranged in the shape of a cylinder having a circular cross section. The ends of each bundle of subconductors are attached with insulators to a dead end tower (1). Jumpering allows the electric current to flow between the two bundles of subconductors using jumper buses, internal jumper conductors, and external jumper conductors. One or more current collecting jumper buses (37) are located inside each bundle of subconductors with each jumper bus being attached to the end of a subconductor. Small-diameter internal jumper conductors (33) are located in the inherently electrically shielded area inside each bundle of subconductors with each subconductor (except ones having an attached jumper bus) having one internal jumper conductor connected between that subconductor's end and a jumper bus. Large-diameter external jumper conductors (9) are located outside each bundle of subconductors with one or more external jumper conductors being connected between the jumper buses in one bundle of subconductors and the jumper buses in the other bundle.

12 Claims, 12 Drawing Figures

OVERHEAD ELECTRIC POWER TRANSMISSION LINE JUMPERING SYSTEM FOR BUNDLES OF FIVE OR MORE SUBCONDUCTORS

The United States Government has licensee rights in this invention.

BACKGROUND OF INVENTION

This invention relates to the interconnecting of electric power transmission lines when conductor bundles are insulatively attached to a dead end tower.

Overhead electric power transmission lines, such as high voltage lines, are connected to dead end towers for a variety of reasons. It may be where the line turns or where protection is required from domino-type failures or where the topography of the land beneath the lines dictates a more stable support to meet the physical line loadings involved. With the introduction of ultra high voltage (UHV) transmission lines in the 1,000 kilovolt (kV) range and higher, the conductors of these lines have been grouped into generally cylindrical bundles of 5 to 16 or more conductors with each conductor within a bundle commonly referred to as a line subconductor. This large number of heavy line subconductors—typically three or six bundles or phases for ac and two or four bundles or poles for dc—arriving at a dead end tower presents a multitude of mechanical and electrical problems in jumpering through or around the tower. These bundles of elongated concentrically arranged line subconductors can be collectively thought of as a single large expanded conductor where the electrostatic and electromagnetic fields are concentrated on the outside of the bundles with little or no fields interacting within the bundles. In the present invention, the internal jumper conductors, fittings, and jumper buses are all within this inherently electrostatically and electromagnetically shielded internal bundle region. This allows smaller diameter jumper conductors of standard lengths, regardless of terrain or line angle, to be used for the jumper conductors without causing any noise or corona, and they can be conveniently and efficiently shop fabricated. One further advantage of this internal jumpering, which allows the external jumpers to connect to a jumper bus, is the elimination of the problem in the prior art of getting the external jumper between the subconductors of the line bundle to connect directly to the fitting ends of the line subconductors without wear and damage over a period of time from rubbing against each other during their movement due to the elements.

In the past, when a bundle of line subconductors was to be connected at a dead end tower to the continuing segment of the line, the jumper bundle subconductors were directly connected to the line subconductors by bolting together the pads of their respective compression fittings as later shown in FIG. 4. In such an arrangement, a good proportion of these external jumper subconductors must go between or closely adjacent to the relatively closely spaced line subconductors to make this connection. This becomes impracticable as the number of line subconductors in a bundle is increased or as the overall diameter of the bundle is reduced or where asymmetric bundles are used wherein the spacing between subconductors is reduced in the bottom portion of the circular bundle to optimize the electrical design of the bundle. These external jumper subconductors must normally have the same diameter and number as the large line subconductors and also maintain their circular configuration because they are both exposed to the same high voltage gradient external to the bundle. It is extremely difficult to maintain the jumper bundle configuration or to make proper connections to the line subconductors with such large diameter, hard and stiff jumper subconductors. And even when such connections are made, the jumper subconductors and adjacent line subconductors are subject to mechanical damage under dynamic conditions caused by ice and wind. Thus, although external jumpering of an electric power transmission line conductor bundle is possible, it is impractical because of the multitude of limitations it presents.

Representative patents are the two U.S. Pat. Nos. to Otsuki, et al. (3,624,268) and Okada et al (3,647,933) and the Austrian Pat. No. to Hofmann (177823). Otsuki, et al. externally jumpers the transmission line subconductors to provide a rigid jumper cable capable of withstanding the swinging movements of a flexible jumper to insure electrical tower clearance. As the external jumpers are fully exposed to the external voltage gradient of the subconductor bundle, their jumper subconductors must be the same diameter as the line subconductors. Such is not the case with the present invention as all internal jumpers are inherently electrically shielded by virtue of being entirely internal to the transmission line bundle and thus may be of substantially smaller cross-sectional diameter than the line subconductors. The patent to Okada, et al. discloses a swayable supporting insulator beam attached to a dead end tower with its jumper being useable for either a single or twin bundle transmission line. Hofmann discloses a jumper fitting for attaching a single jumper to two or more jumpers that are externally connected to the subconductors of a transmission line bundle. Other patents of general interest are: Japanese Pat. No. (44-21073), Japanese Pat. No. (46-31428), Japanese Pat. No. (46-38231) and Barton U.S. Pat. No. (3,129,279).

Various other objects and advantages will appear from the following description of an embodiment of the invention, and the most novel features will be particularly pointed out hereinafter in connection with the appended claims. It will be understood that various changes in the details, materials, and arrangements of the parts which are herein described and illustrated in order to explain the nature of this invention may be made by those skilled in the art without departing from the scope of the invention.

SUMMARY OF THE INVENTION

This invention concerns itself with the jumpering at dead end towers of overhead electric power transmission line bundles consisting of a plurality of terminating line subconductors. The subconductors of the transmission line bundle are connected by internal jumper conductors to one or more (but normally two) jumper buses within the volume or space defined by the configuration of the subconductors of the bundles. One or more external jumper conductors connected to the said one or more jumper buses pass through or around the tower to connect in similar manner to the transmission line bundle attached on that side of the tower.

The primary object of this invention is an improved and practicable system of connecting jumper conductors to overhead electric power transmission line conductor bundles.

DESCRIPTION OF THE DRAWINGS

FIG. 10 is a top view in the direction of arrows 10—10 in FIG. 6 of a jumper bus made up of two parallel rectangular bus bars with end plates. It shows the configuration and the balanced connections of the external and internal jumpers to the bus to meet the required current carrying capacity of the bundle. The number and design of these bus bars making up the jumper bus are determined by both current and strength requirements. Normally two buses are required for each transmission line bundle to provide an adequate base for connecting and forming the external jumper bundle.

FIG. 11 is a simplified schematic drawing depicting the invention. For example, the grading rings (located on the energized conductor end of the insulators) are omitted. The jumper bus is shown in this case with only one bus bar.

DETAILED DESCRIPTION

Figure 1:
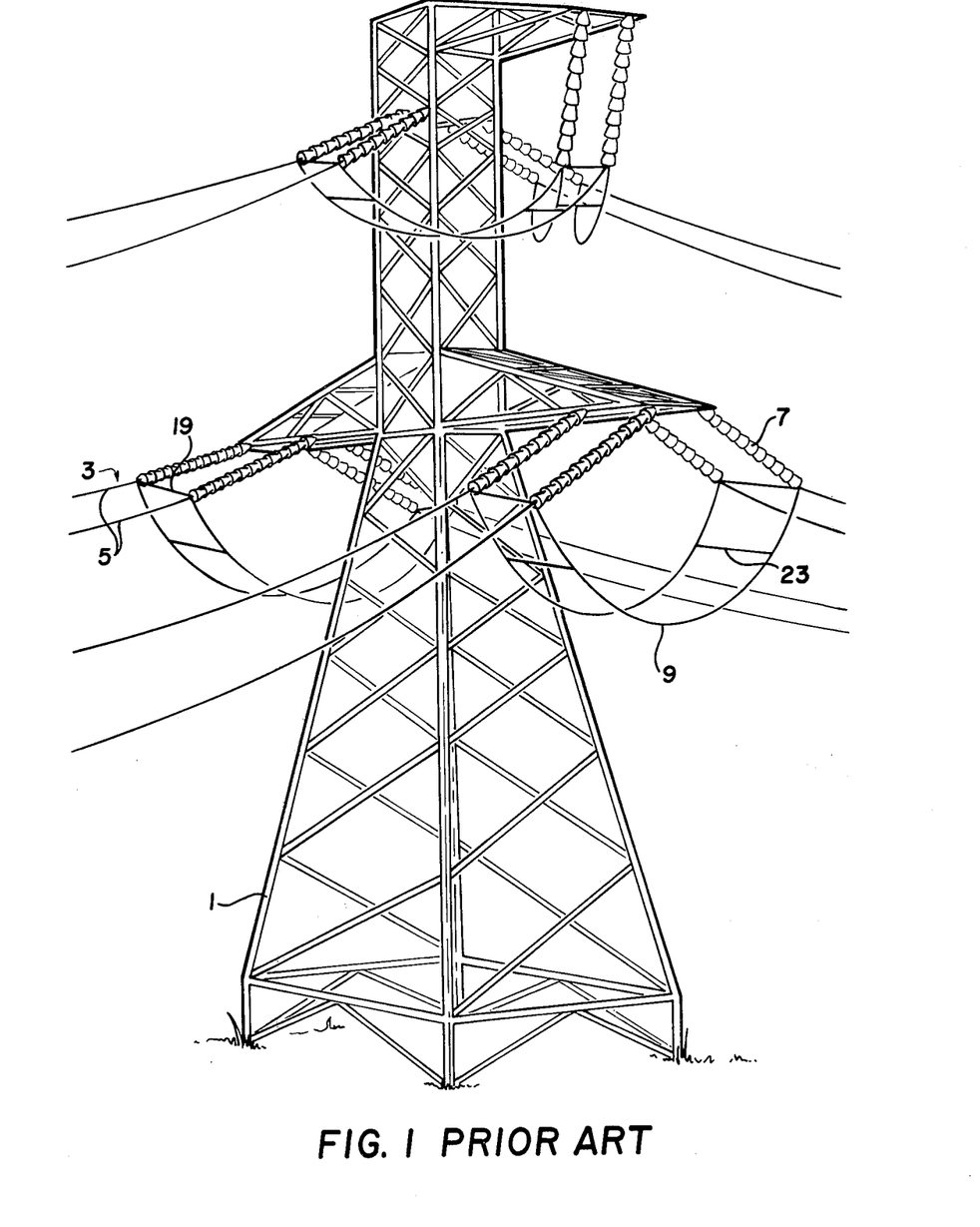
FIG. 1 illustrates a typical prior art high voltage twin bundle power line connected at a dead end tower.

The prior art figures illustrate the general present state of the art wherein high voltage transmission lines are connected to dead end towers. In the FIG. 1 illustration, the conventional dead end tower 1 supports a three-phase twin bundle transmission line (three separated bundles 3), each of which is made up of two line subconductors 5. In this prior art example, the phase voltage between these bundles is 500 kV with all conductors of any bundle being at the same voltage level, that is, zero voltage between subconductors of a bundle. Referring to FIG. 1, it can be seen that these line subconductors terminate short of the towers immediately before the dead end insulator strings 7. Connecting the two line subconductors of each bundle to the two line subconductors of the transmission line continuing from the opposite tower face are external jumper subconductors 9 also arranged in a bundle. Thus in the three-phase bundle system shown, there would be three twin bundle jumpers spanning the space starting at the outermost sides of the insulator strings as measured away from the tower.

Figure 2:
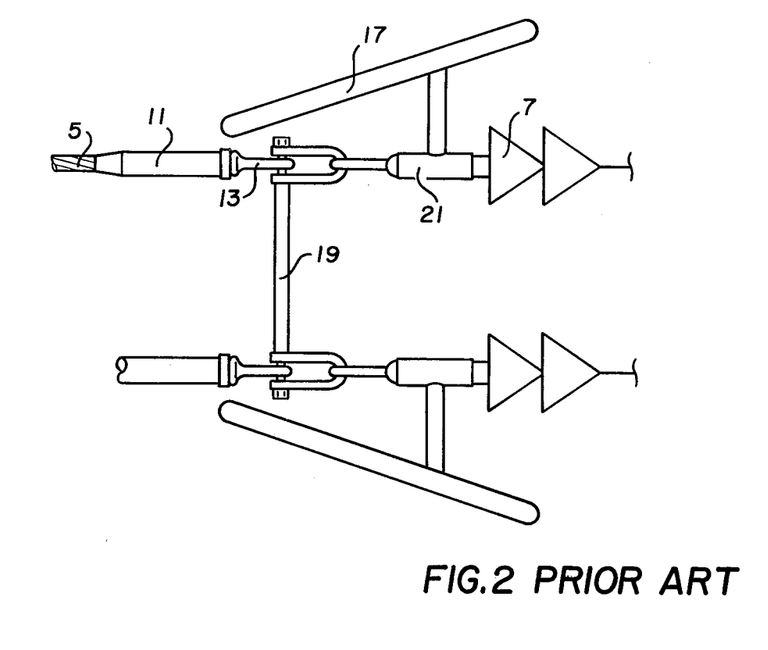
FIGS. 2 and 3 are two enlarged views, top and side respectively, of the insulated dead end hardware assembly of FIG. 1 showing how the prior art jumper subconductors are joined to the twin bundle line subconductors.
Figure 3:
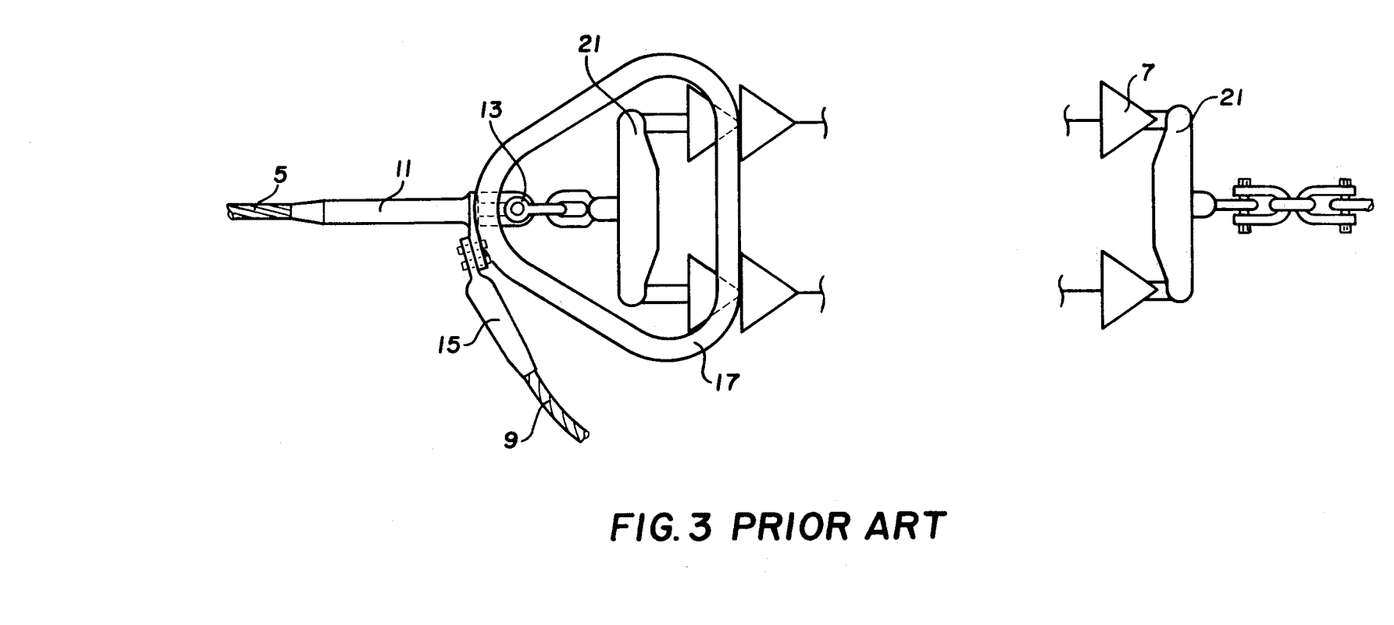

As best shown in the FIG. 2 top view and the FIG. 3 side view, each line subconductor 5 terminates at a compression dead end fitting 11. The tower end of the dead end compression fitting consists of a compression steel oval eye 13. The jumper fitting 15 compressed on each external jumper subconductor 9 is connected by bolt heads to the pad on the dead end compression fitting (see FIG. 3). Each external jumper subconductor 9 extends from its compression jumper fitting 15 to the next compression jumper fitting 15 (not shown) on the opposite side of the tower to thereby provide a continuous electrical path for the system through or around the dead end tower. Grading rings 17—only one of which is shown in the side view of FIG. 3 (the second one is directly behind it)—act to reduce corona and noise commonly caused by outer edges of conductor hardware and fittings and also to grade the insulators on the energized conductor end for better voltage distribution. The spreader assembly 19 (see FIG. 2) keeps the line subconductors and their respective twin insulator strings 7 physically separated. The four dead end yokes 21 support and maintain the spacing between the pair of parallel insulator strings 7 and attach the line conductors to the tower through their connections. Conventional shunting spacers 23, FIG. 1, maintain the physical spacing between jumper subconductors required for high voltage operation and also prevent contact between subconductors from wind and ice action.

Certain characteristics of the prior art FIGS. 1 to 3 system are to be noted. First, the diameter of the two external jumper subconductors 9 must be the same as the two line subconductors 5 as both are exposed to the high voltage gradient external to the bundle formed by their respective two subconductors. This requirement in a high voltage line would dictate that the jumper subconductors be stiff, and hard to form, bend, and/or twist in connecting the jumper subconductors to the line subconductors. With higher voltage lines and more conductors in each bundle—usually five or more for UHV—these restrictions on the ability to work with the jumper subconductors to position them between the relatively closely spaced line subconductors for necessary connections, and to properly form and shape the jumper bundle, present a serious practical problem at the dead end towers.

Figure 4:
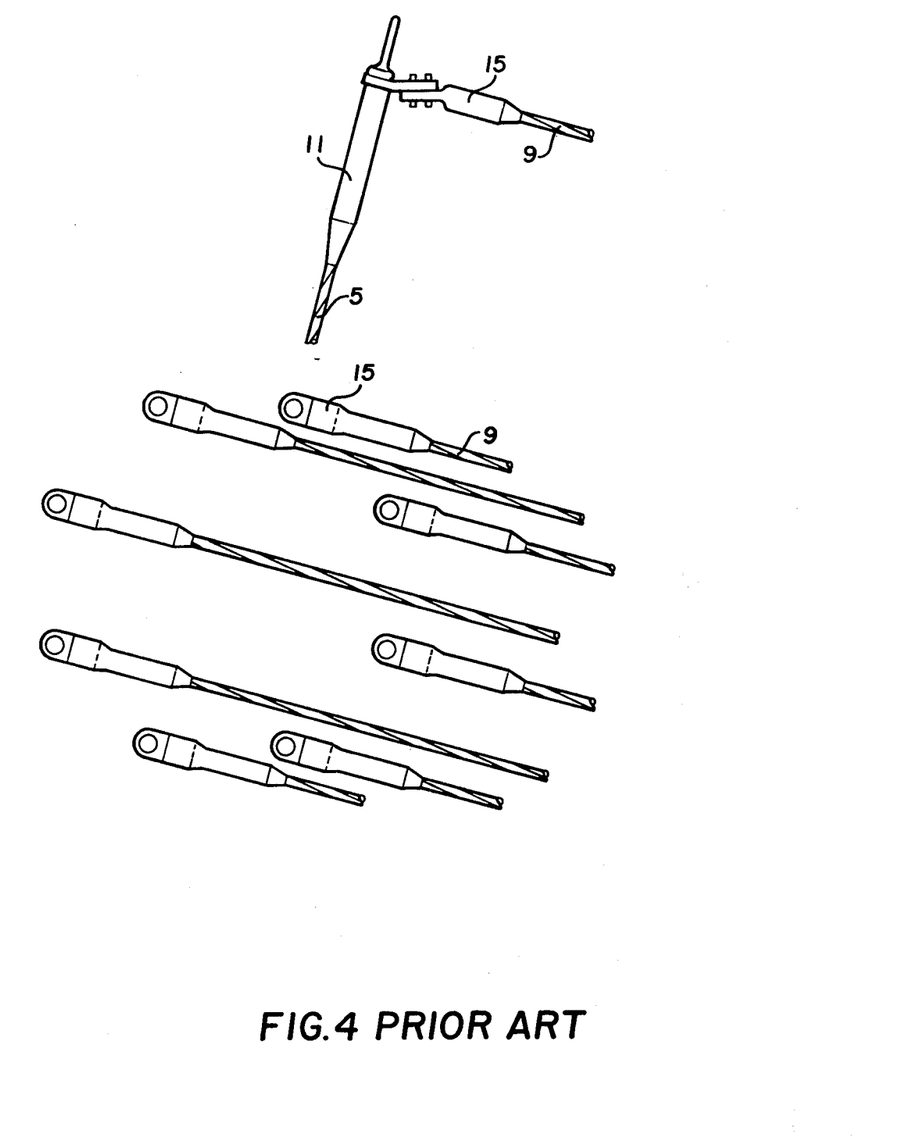
FIG. 4 shows the prior art method for extending the external jumpers through the closely spaced subconductors of an 8-bundle UHV transmission line for directly connecting to the respective compression fitting jumper pads of the line subconductors.

FIG. 4 shows the prior jumpering art and can be compared with FIGS. 5, 6, 7, and 8 concerning the present invention. FIG. 4 shows an 8-bundle line where the jumper pads on fittings 11 of the line subconductors 5 are oriented for directly connecting to the jumper pads on fittings 15 of the external jumpers 9 in accordance with the prior art. Some of the external jumpers 9 must extend into the bundle between the line subconductors 5 at their terminating fittings 11, whereas others must pass closely adjacent to the line subconductors 5 at their terminating fittings 11. Each jumper must be of different length to make the connection. This is impracticable for an operating line because of the physical damage that will occur from the dynamic behavior of the intermeshed jumpers and line subconductors under ice and wind conditions.

Figure 5:
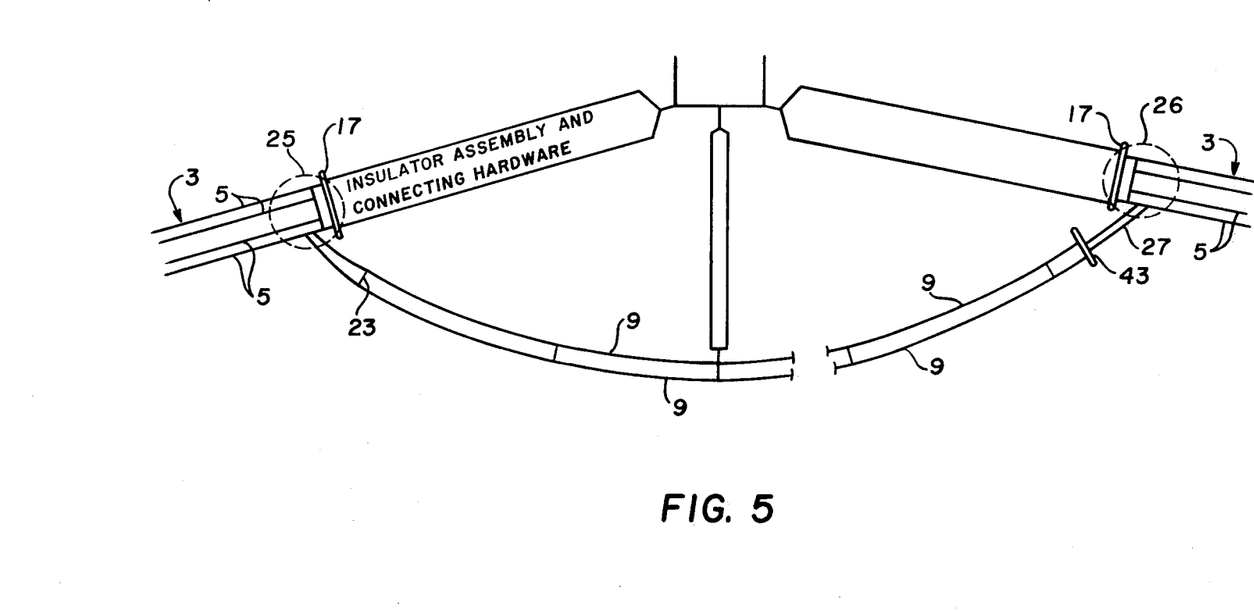
FIG. 5 schematically illustrates in a side view how the preferred embodiment of this invention would appear at a dead end tower of a UHV transmission line.

To overcome these restrictions of the prior art, the scheme of internal and external jumpering, set out schematically in FIG. 5, is disclosed. Essentially this differs from the prior art by requiring that internal jumper conductors be used with usually a pair of jumper buses for collecting the line current so that their connections to both the generally parallel spaced apart elongated line subconductors and the external jumper subconductors remain within the negligible voltage gradient found within the transmission line bundle. Consider the example as shown in the preferred embodiment where there are eight main line conductors in the bundle with these conductors being placed so that their cross sectional circumference approximates a circle. In this configuration the large diameter generally cylindrical bundle would in effect act as an "expanded single conductor" with adequate size to hold the voltage gradient on the outer surfaces of the subconductors to the level required for power transmission without excessive corona power losses and excessive audio and radio noises. Inside this cylindrical volume formed by the circle of bundled conductors, the voltage gradient is negligible. It is there that the internal jumpers transmit the current from each line subconductor to the jumper bus. From this bus the current is then sent to the external jumper subconductors set up outside of the "expanded single conductor" formed by the configuration of the cylindrical bundle of line subconductors.

Figure 6:
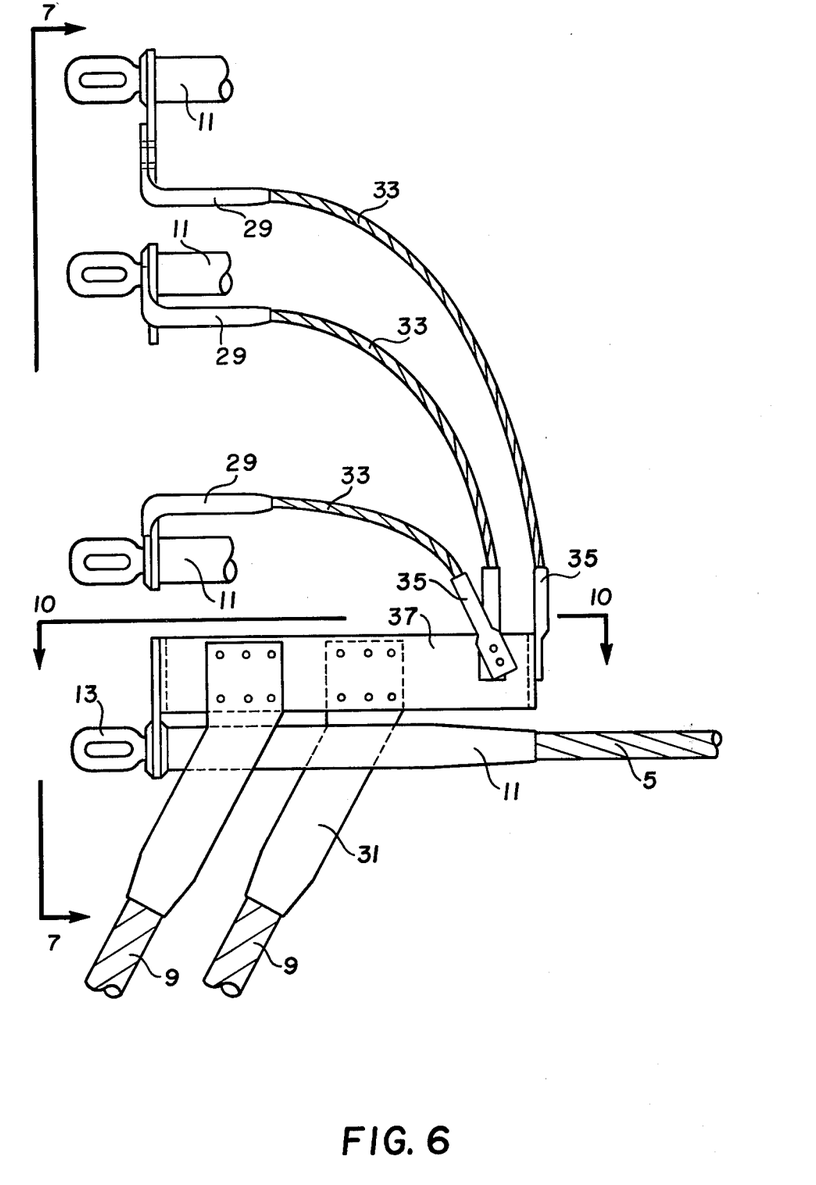
FIG. 6 illustrates in a side view how the preferred embodiment of the invention would be connected to the dead end tower with internal jumpers connected between the line subconductor compression fitting jumper pads and a jumper bus that is likewise connected to a line subconductor compression fitting jumper pad.
Figure 7:
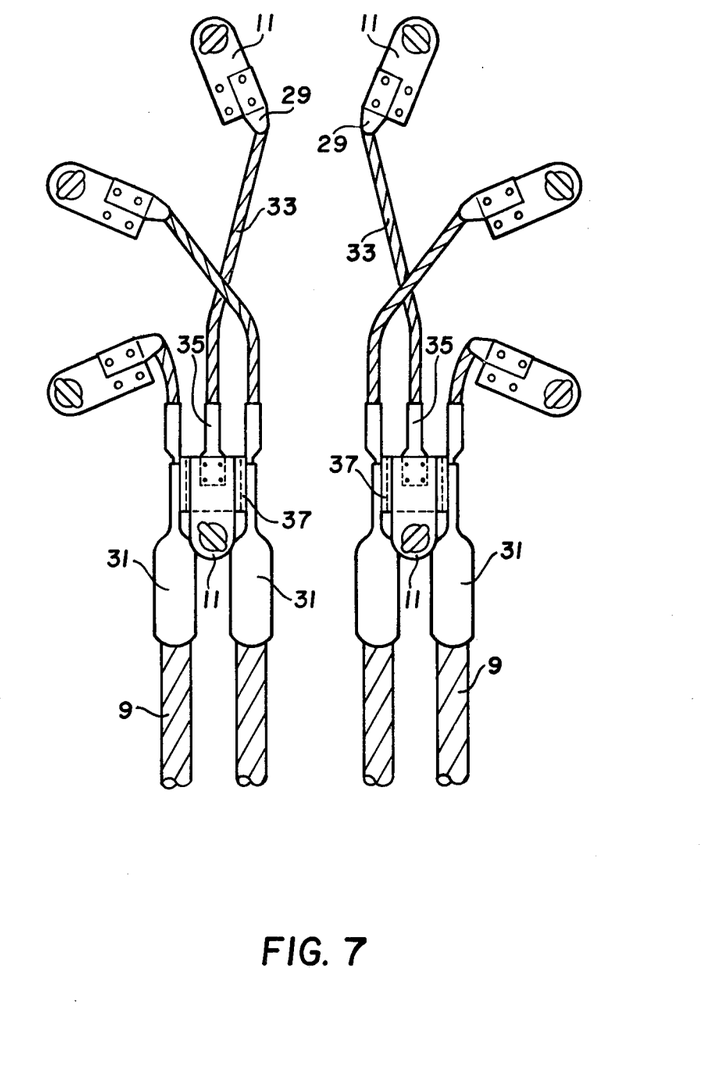
FIG. 7 is viewed in the direction of arrows 7—7 in FIG. 6 and shows the required six internal jumper conductors of an 8-bundle UHV transmission line connected to a pair of jumper buses that also provide the support for connecting the four external jumpers. The remaining two line subconductors transfer their electrical current directly to the respectively connected jumper bus.
Figure 10:
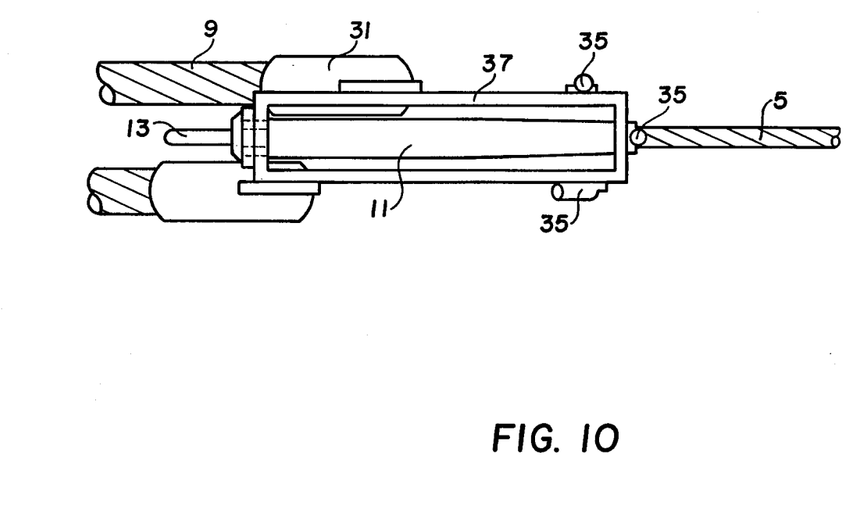

FIG. 5 is a side view schematically illustrating the preferred embodiment of this invention. Some of the common elements of the prior art discussed with respect to FIG. 1–4 have been designated by the same numbers, and some of the parts (e.g. the insulator strings 7, etc.) have been grouped together as the insulator assembly and connecting hardware normally referred to as a dead end assembly. FIG. 5 shows only one of the three bundles 3 with four of its eight line subconductors 5 (the other four line subconductors are directly behind those shown). The essence of this invention would be enclosed within the circle 25 from which extends the external jumper subconductors 9 (see left circle and FIGS. 6 and 7), as well as within the second circle 26 from which extends the external jumper subconductors 27 (see right circle and FIG. 8) which are proximately attached to the conversion ring 43. FIGS. 6 and 7 illustrate in two detailed views the contents of the circle area 25. Each of the eight line subconductors 5 terminates in a compression dead end fitting 11 which is physically connected to the dead end tower through the dead end assembly by oval eye 13. Extending from each of the internal compression jumper fittings 29 bolted to the pad of compression fitting 11 on six of the line subconductors 5 is the internal jumper conductor 33. The six internal jumper conductors are connected through compression jumper fittings 35 to the two jumper buses 37, three to each bus. As the internal jumpers are not subject to appreciable mechanical stresses, more compact welded type fittings may be substituted for compression type fittings 29 and 35 on the internal jumpers 33. Each of the two jumper buses is bolted to the pad of the compression dead end fitting 11 on each of the two remaining line subconductors 5. The pair of jumper buses is designed electrically to carry the 8-bundle current and is designed mechanically to support the external jumpers (and conversion rings when used). FIG. 10 shows the designed shape of the jumper bus to accomplish this. The current flow is always balanced by bolting the internal jumpers on both sides of the bus and on the end where an odd number of internal jumpers is involved. The jumper bus provides a common base for establishing the length of both the internal jumpers 33 and external jumpers 9 (and external jumpers 27 when used). Each jumper bus directly connects to the external jumpers 9 via compression jumper fittings 31. As shown in FIGS. 6 and 7, two external jumpers 9 in this example are connected to each rigid bus making up a 4-bundle jumper. As can be seen, the jumper bus provides a practicable means of externally tapping the line bundle as a whole by jumpers of any number and size independent of the makeup of the transmission line bundle.

Figure 8:
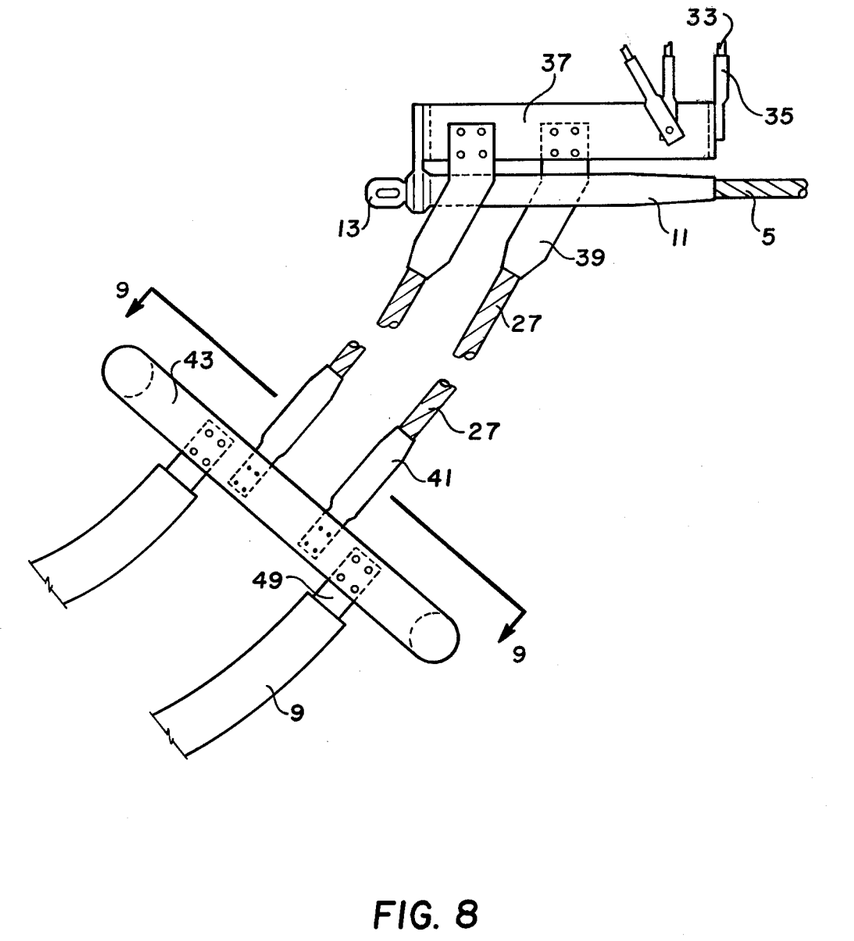
FIG. 8 shows in a side view a conversion ring 43 in the external 4-bundle jumper to increase the size of the subconductors in the electrically shielded region to the right of the ring to the diameter required for operating electrically in the unshielded region to the left of the ring. In one test, the four subconductors to the right of the ring were the same size as those used in the 8-bundle UHV transmission line; those on the left of the ring were large size tubes.
Figure 9:
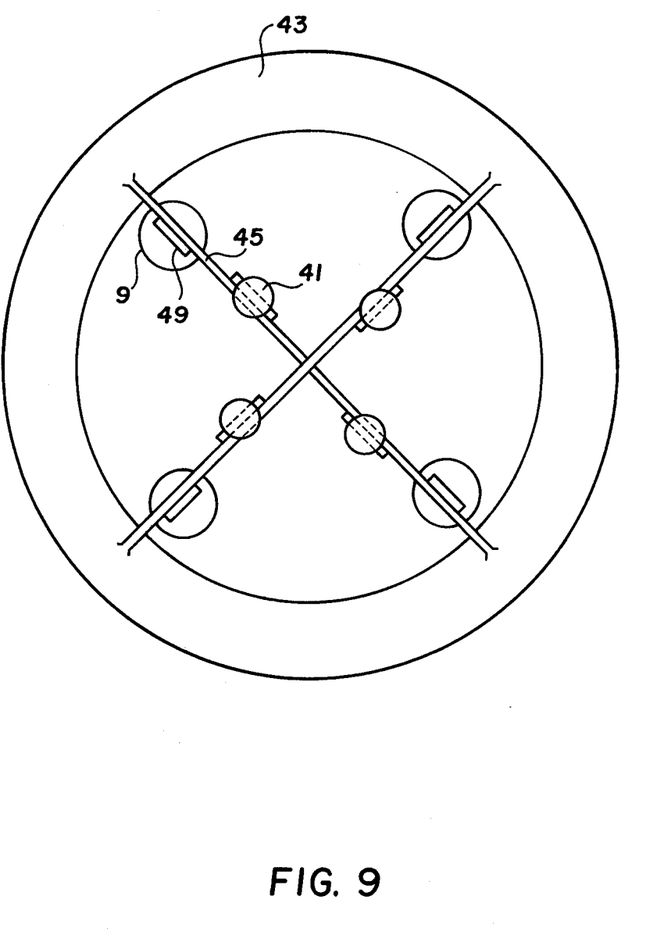
FIG. 9 is a front view of the conversion ring assembly in the direction of arrows 9—9 in FIG. 8 depicting the connections of the external jumper subconductors connected between the jumper bus and its proximate conversion ring, and the external jumper tubes connected between the conversion rings. Any other electrically satisfactory combination of these conductors may be used.

FIG. 8 depicts the use of the conversion ring 43 in the external jumpers to change their number and/or size. Extending downwardly, the external jumper subconductors 27 have compression jumper fittings 39 bolted to the jumper bus and jumper fittings 41 bolted to the coversion ring 43. This ring—shown in the side view in FIG. 8—would typically consist of an aluminum ring with two internal intersecting conducting cross bars 45 as shown in FIG. 9. FIG. 9 is viewed in the direction of arrows 9—9 in FIG. 8. The four external jumpers 27 are of the same diameter as the eight line subconductors but are adequately electrically shielded by the electric field generated around the conversion ring 43 and the transmission line bundle including the dead end assembly and grading ring 17. Bonneville Power Administration laboratory tests showed the effectiveness of this shielding up to a 10-foot external jumper 27 length.

The four external jumpers 27 (two from each jumper bus) are bolted through jumper compression fittings 41 to the inner portion of the cross bars 45 such that one fitting is attached to each of the four legs of the bar. Further out on cross bar 45 from its point of intersection are bolted four large external jumper subconductors 9 fabricated, for example, from aluminum tubes with the large diameter required for the UHV voltage gradient on a four conductor bundle. Such tubes would have plates 49 welded to their ends for bolting to the conducting cross bars 45. For this method, where the number and/or size of the subconductors are changed within the length of the larger diameter external jumpers 9, a conversion ring 43 and smaller diameter external jumpers 27 would normally be used on both ends. Another method not requiring conversion rings is to jumper through or around the dead end tower between the jumper busses with external jumpers of adequate number and size required for the UHV voltage gradient (see FIGS. 6 and 7). These two methods are schematically illustrated on FIG. 5, with the former shown with the conversion ring on the right half portion of the external jumper 9 and the latter shown without the conversion ring on the left half portion of the external jumper.

A working embodiment of this invention employing a bundle or phase voltage of 1,100 kV, with internal jumper conductors made up of six 0.793-inch diameter (0.375 sq. inches) all-aluminum conductors and with two jumper buses, is capable of carrying the required 5250 amperes for 10,000 megawatt 3-phase transmission (see FIGS. 6, 7, and 8). Inputted thereto are eight line subconductors of 1.602 inch diameter ACSR (Aluminum Conductor Steel Reinfored) conductors (1.398 sq. inches of aluminum and 0.114 sq. inches of steel). The total full load rating of the eight line subconductor bundle is 11,600 amperes or more than twice the 5250 amperes which would actually be carried at full transmission line capacity. Since the internal jumper conductors are all aluminum and are of much smaller diameter (0.793 inches vs. 1.602 inches) than the line subconductors, greater flexibility is possible to facilitate their placement within the confines of the bundle. The internal jumpers require only minimal strength as they are not subjected to appreciable mechanical stresses. Only the current requirements govern their size and not the current, voltage and strength requirements that govern the size of the line subconductors which must not only support themselves over long spans, but also withstand exposure to ice and wind. Satisfactory UHV operations within limits for permissible radio noise and corona power losses dictate conductor diameters much larger than would be required only for current carrying capacity.

The main problem in collecting large electric currents internally within the bundle is to accomplish this without directly tapping the stranded line subconductors, particularly for the repeated jumpering required at the many dead end towers common to a transmission line. Clamping devices directly on stranded line conductors under line tension can, in time, result in abrasion from ice and wind loads, strand fatigue failure, and overheating of the clamping device with subsequent electrical or mechanical failure. The jumper bus avoids this problem by collecting internally these subconductor currents only after they have passed normally through the heavy duty compression dead end fittings on the line subconductors and the solidly bolted jumper pads.

Depending on the type of dead end towers, the external jumpers may take off vertically, horizontally, or at any other angle, by attaching the pair of jumper buses on the properly oriented pair of subconductors in the bundle of the transmission line.

Internal jumpering can be used to considerable advantage not only on UHV lines, either ac or dc, but also on low voltage lines which use multiple conductor bundle design for purposes of transmitting very large current values. This jumpering concept can also be used for electrically tapping power off a transmission line within a span between the supporting towers by bolting the jumper bus to the pad on a compression splice, a split type compression repair sleeve, or a heavy duty bolted line clamp rather than bolting to the pad on the compression dead end fitting 11.

Figure 11:
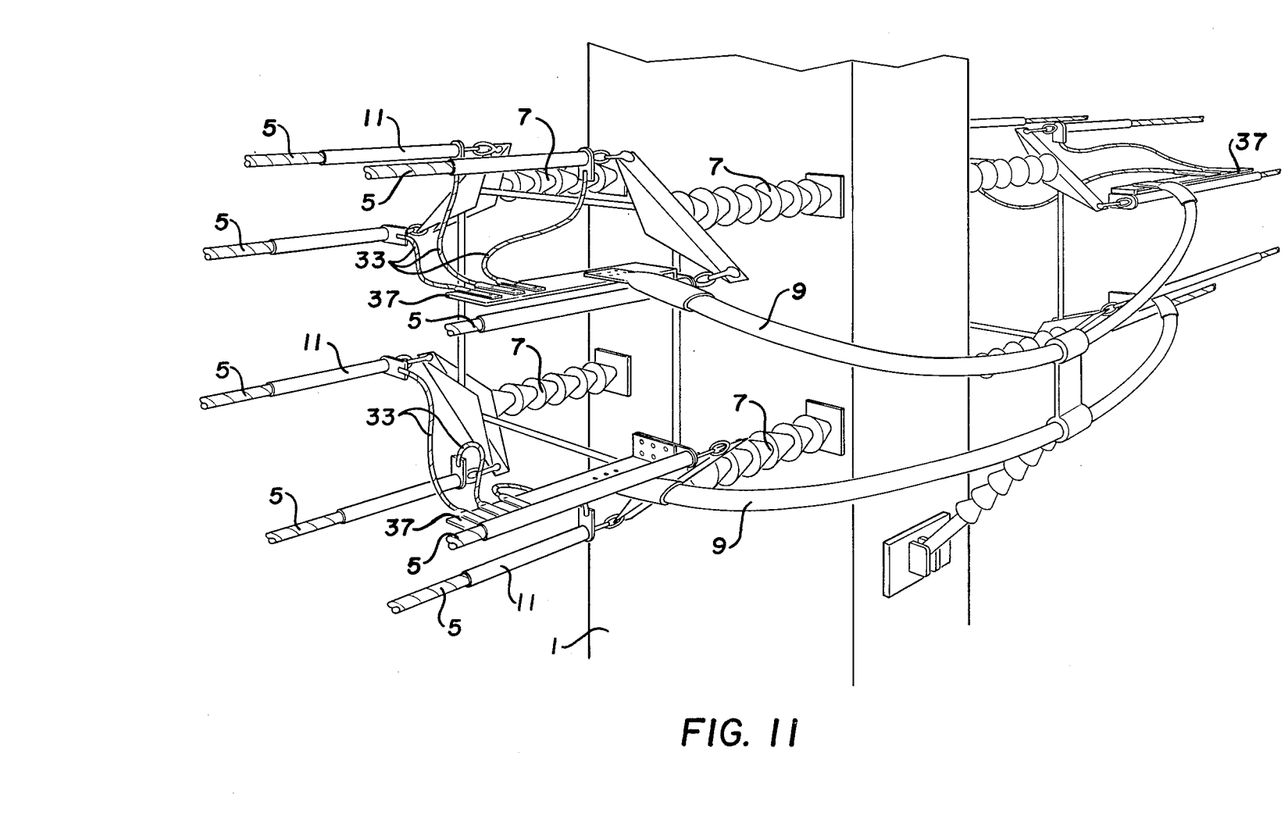

FIG. 11 sums up in simplified form the entire basic invention showing one phase or bundle of a 3-phase transmission line. A bundle of eight transmission line subconductors 5 coming from the left is attached to a dead end tower 1 with insulators 7. Another bundle is likewise attached to the dead end tower from the right. In each of these two bundles, each of two jumper buses 37 is directly connected to a separate line subconductor. In each transmission line bundle, internal jumper conductors 33 connect the ends of the remaining six line subconductors to the two jumper buses 37, with each jumper bus 37 receiving three internal jumper conductors 33. Two large diameter external jumper subconductors 9 connect the two jumper busses 37 in one bundle with the two jumper busses 37 in the other bundle allowing current to flow between the transmission line bundles on opposite sides of the tower. The left half portion of FIG. 5 schematically shows this concept.

Figure 12:
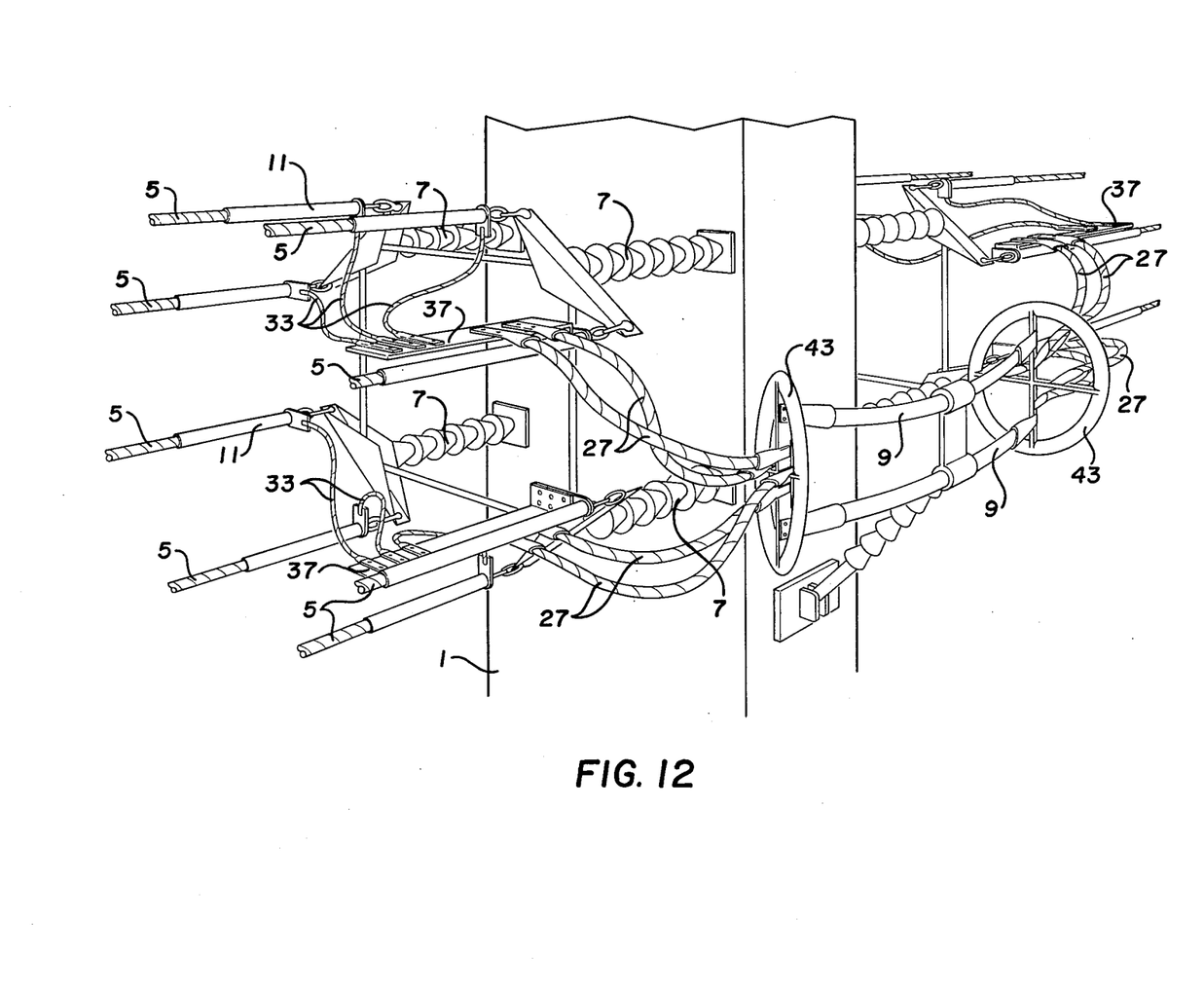
FIG. 12 is a simplified schematic drawing depicting FIG. 11 with the addition of the optional conversion rings.

FIG. 12 sums up in simplified form the conversion ring option. In this option, the two larger diameter external jumper subconductors 9 connect the conversion ring 43 associated with the transmission line bundle on one side of the dead end tower with the conversion ring 43 associated with the transmission line bundle on the other side of the dead end tower. Four smaller diameter external jumper conductors 27 connect the conversion ring 43 with its associated pair of jumper buses 37. The right half portion of FIG. 5 schematically shows this concept.

It should be apparent that the type of fittings used, the number of subconductors, internal and external jumpers and jumper buses used, bundle configuration, and many of the other features may vary. None of these specific details is to be used to limit the scope and extent of this invention which is to be measured only by the claims which follow.

What I claim is:

1. An overhead electric power transmisssion line jumpering system for interconnecting two transmission line conductor bundles which terminate at and are insulatively attached to a common supporting structure, each of said transmission line conductor bundles being generally a cylindrical array of at least five parallel spaced apart elongated electrical transmission line subconductors operable at the same voltage level at any instant of time with terminal ends generally disposed in a common circular plane adjacent to said supporting structure, said system comprising:
   a. at least one jumper bus located within each of said bundles and attached to one of said transmission line subconductors adjacent its terminal end;
   b. internal jumper conductors located within each of said bundles, one of which is connected from each of said remaining transmission line subconductors adjacent its terminal end directly to one of said jumper buses; and
   c. at least one external jumper conductor connected from said jumper bus in one of said bundles and extending outside of said bundle to said jumper bus of said other bundle to provide current flow between the said two transmission line conductor bundles.

2. The system of claim 1 wherein the cross-sectional diameter of the said internal jumper conductors is appreciably smaller than the cross-sectional diameter of the said transmission line subconductors.

3. The system of claim 2 wherein each of said transmission line conductor bundles carries ac current of the same phase.

4. The system of claim 3 also including two other systems of claim 3 wherein each of said systems carries ac current of a different phase.

5. The system of claim 4 wherein the voltage carried by said transmission line conductor bundle is at least one million volts between phases.

6. The system of claim 5 wherein there are eight subconductors in each of said transmission line conductor bundles.

7. The system of claim 6 wherein there are two jumper buses for each transmission line conductor bundle and three internal jumper conductors electrically connected to each of said jumper buses.

8. The system of claim 7 wherein there are two external jumper conductors extending from each of said jumper buses.

9. The system of claim 8 wherein the said supporting structure is a dead end tower.

10. An overhead electric power transmission line jumpering system for interconnecting two transmission line conductor bundles which terminate at and are insulatively attached to a common supporting structure, each of said transmission line conductor bundles being generally a cylindrical array of at least five parallel spaced apart elongated electrical transmission line subconductors operable at the same voltage level at any instant of time with terminal ends generally disposed in a common circular plane adjacent to said supporting structure, said system comprising:

a. at least one jumper bus located within each of said bundles and attached to one of said transmission line subconductors adjacent its terminal end;
b. internal jumper conductors located within each of said bundles, one of which is connected from each of said remaining transmission line subconductors adjacent its terminal end directly to one of said jumper buses;
c. a conversion ring located outside each of the two transmission line conductor bundles;
d. at least one external jumper conductor connected between the two conversion rings; and
e. at least one external jumper conductor connected between said jumper bus and its proximate conversion ring, to provide current flow between the said two transmission line conductor bundles.

11. The system of claim 10 wherein the said at least one external jumper conductor connected between said jumper bus and its proximate conversion ring is located within the region electrically shielded by the electric field generated around said conversion ring and said transmission line conductor bundle.

12. The system of claim 11 wherein the cross-sectional diameter of said at least one external jumper conductor connected between said jumper bus and its proximate conversion ring is appreciably smaller than the cross-sectional diameter of said at least one external jumper conductor connected between the two conversion rings.

* * * * *